United States Patent [19]
Cantwell et al.

[11] 3,736,791

[45] June 5, 1973

[54] GYRO AXIS PERTURBATION TECHNIQUE FOR CALIBRATING INERTIAL NAVIGATION SYSTEMS

[75] Inventors: Joseph R. Cantwell, Huntington; Samuel L. Fagin, New York; Hyman Strell, Jericho, all of N.Y.

[73] Assignee: The United States of America as represented by the Secretary of the Navy

[22] Filed: Aug. 18, 1967

[21] Appl. No.: 662,274

[52] U.S. Cl. ................................................73/1 E
[51] Int. Cl. .............................................G01c 25/00
[58] Field of Search ................73/1 D, 1 DV, 67, 73/71, 1 E

[56] References Cited

UNITED STATES PATENTS

| | | | |
|---|---|---|---|
| 2,882,718 | 4/1959 | Shaw | 73/1 D |
| 3,165,913 | 1/1965 | Perls et al. | 73/1 DV |
| 3,282,081 | 11/1966 | Boskovich et al. | 73/1 D |

*Primary Examiner*—Verlin R. Pendegrass
*Attorney*—Louis A. Miller, Louis B. Applebaum and Philip Schneider

[57] ABSTRACT

A method whereby the misalignment of the east-seeking-gyro input axis of a ship's inertial navigator system (SINS) is measured relative to the pitch axis of its stable platform. The roll axis of the platform is nominally perpendicular to the pitch axis and is constrained to a fixed angle about the heading axis. The east-seeking-gyro input axis is oscillated (perturbed) about the platform pitch axis at a relatively high rate but samll amplitude, $\theta_p$. If the input axis is not orthogonal to the pitch axis by an amount $n$, a rate $\dot{\gamma} = \dot{\theta}^p \sin\cdot n$ is sensed along the input axis of the gyro. Processing of this rate through suitable computer circuits provides the amount of non-orthogonality, or misalignment, $n$.

9 Claims, 8 Drawing Figures

DIAGRAM ILLUSTRATING PERTURBATION CONCEPT $n$ = NONORTHOGONALITY OF GYRO IA RELATIVE TO AXIS P $\theta p$ = PERTURBATION ANGLE ABOUT AXIS P $\dot{\theta}_p$ = PERTURBATION RATE $\dot{\gamma}$ = RATE CHANGE OF PERTURBATION ANGLE SENSED ALONG INPUT AXIS OF GYRO

*DIAGRAM ILLUSTRATING PERTURBATION CONCEPT*

GYRO AXIS PERTURBATION TECHNIQUE FOR CALIBRATING INERTIAL NAVIGATION SYSTEMS

This invention relates to a method for determining the misalignment of a gyro input axis which is nominally orthogonal to a reference axis and especially to methods and means for measuring the misalignment of the sensitive axis of inertial platform gyroscopes by the use of platform gimbal perturbation.

Inertial navigation systems are useful in guiding vehicles such as intercontinental ballistic missiles, submarines and space ships to their ultimate destinations. Unfortunately, the gyroscopic devices upon which the inertial systems depend are subject to errors due to a variety of factors and must be recalibrated from time to time to minimize the error. It becomes vital to precise navigation to be able to measure the misalignment of the inertial plateform gyros relative to a reference platform quickly, simply and accurately. The present invention accomplishes this for the earth-seeking gyro with a minimum of additional equipment or disturbance to existing equipment.

The objects and advantages of the present invention are accomplished by perturbating (oscillating) the sensitive or input axis of a platform gyro, e.g., the east gyro, at a high rate but small amplitude, about another platform axis, e. g., the pitch axis, nominally perpendicular to the gyro input axis. If the input axis is not exactly orthogonal to the pitch axis, a rate signal proportional to the amount of non-orthogonality is sensed along the gyro input axis. By suitably processing this rate signal, the actual location of the gyro can be computed relative to the axis about which the gyro is perturbated.

An object of the invention is to determine quickly, accurately and simply, with a minimum of additional equipment and with a minimum of disturbance to normal operations, the amount of error in the stable platform of an inertial navigation system.

Other objects and advantages will appear from the following description of an example of the invention, and the novel features will be particularly pointed out in the appended claims.

Figure 1:
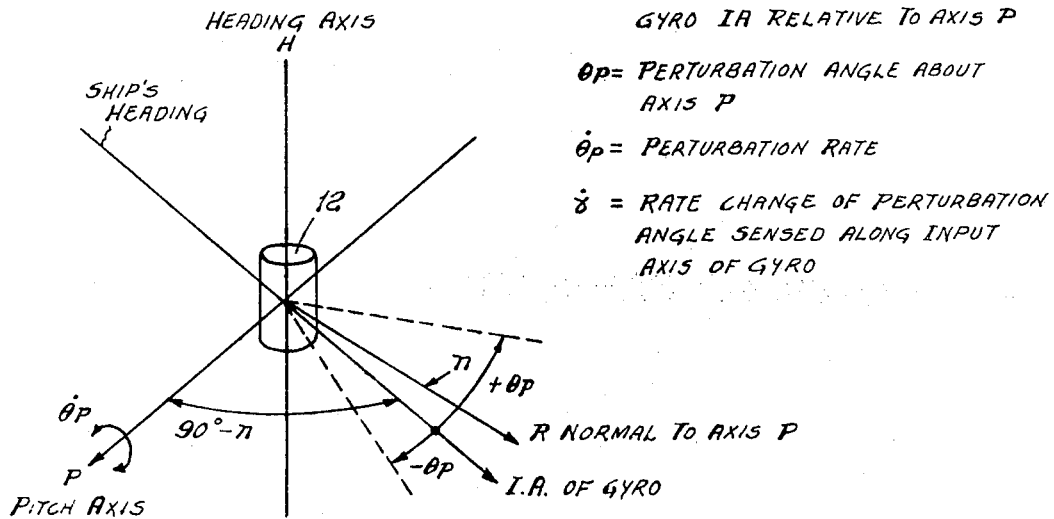
FIG. 1 is a diagram defining the parameters associated with the pitch-axis perturbation concept.

The blocks shown in the figures of the drawing, except for the perturbation generator and the data processor, are conventional parts of a ship's inertial navigation system, such as the Sperry SINS, and require no further description relative to their construction or operation. The perturbation generator is basically an oscillator which provides a sine wave signal of 0.05 cycles per second frequency with an amplitude sufficient to oscillate the stable platform through an angle of approximately ± 4° although this particular choice of frequency and angle is not essential to the invention. The data processor is a computer which provides the mathematical operations necessary to obtain the non-orthogonality, $n$, from its input signals. The input signals differ in various embodiments and therefore the computer circuits differ. However, the mathematical computer art is well advanced and design of the necessary circuits is easily within the capabilities of any competent worker in the art.

The perturbation signal should provide a perturbation rate which is considerably higher (at least 10 times greater) than the horizontal earth rotation rate. Calculation shows that the perturbation rate is about 1.1° per second which is on the order of 200 times the earth rate.

All implementations of the perturbation concept require the following basic elements:

A. a perturbation generator.
B. an axis, nominally perpendicular to the gyro input axis, about which the gyro may be perturbed.
C. a computer, or data processor.

Many implementations of the underlying principle are possible. This principle can be understood by referring to FIGS. 1 and 2. In FIG. 1, a gyro 12, which may be the east-seeking gyro of a SINS, is shown relative to the roll axis R, pitch axis P and heading axis H of a stable platform. The roll, pitch and heading axes form the axes of a three-dimensional, orthogonal coordinate system. The input axes, I.A., of the gyro 12 is shown as misaligned by an amount $n$ with the normal to the pitch axis. The gyro 12 is perturbed, or oscillated, by a small angle, $\theta_p$, which may be in the order of 4° about the pitch axis, P.

Figure 2:
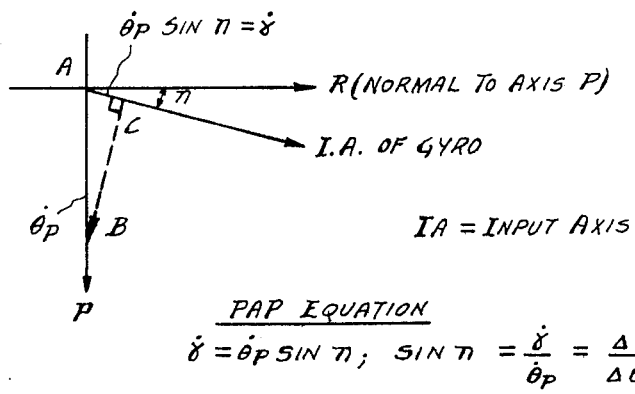
FIG. 2 is a diagram showing how a component of the perturbation rate appears along the input axis of the gyro.

This perturbation about the pitch axis provides a rate of rotation, $\dot{\theta}_p$, which can be treated as a vector in the direction of the pitch axis, P. In FIG. 2, this vector, $\dot{\theta}_p$, is line segment AB and the angular misalignment, $n$, is also equal to the angle ABC, since line segment BC is perpendicular to the input axis, I.A., of the gyro 12. Thus, the line segment, AC, which is the component of the perturbation rate, $\dot{\theta}_p$, lying along the input axis of the gyro 12, turns out to be $\dot{\theta}_p \sin n$. This input-axis component of the perturbation rate, or the rate of change of the perturbation angle sensed along the input axis of the gyro, is called $\dot{\gamma}$. Solving the pitch axis perturbation (PAP) equation $\dot{\gamma} = \dot{\theta}_p \sin n$, it is seen that $$\sin n = \dot{\gamma}/\dot{\theta}_p = \Delta\gamma/\Delta\theta_p .$$

By processing through a data processor, as is described below, the misalignment angle, $n$, can be found from this equation, or from others mathematically equivalent to this, $$n = \frac{\frac{1}{T}\int_0^T \dot{\theta}_R \dot{\theta}_P dt}{\frac{1}{T}\int_0^T \dot{\theta}_P \dot{\theta}_P dt}$$

Here, $T$ is the time over which the terms inside the integral sign are integrated and $\dot{\theta}_R$ is the rate of change of the roll angle. It will be observed that the numerator and denominator terms in this last equation are time-averaged.

Many implementations of the principle involved are possible and will be described as applied to a ship's inertial navigation system (SINS).

Figure 3A:
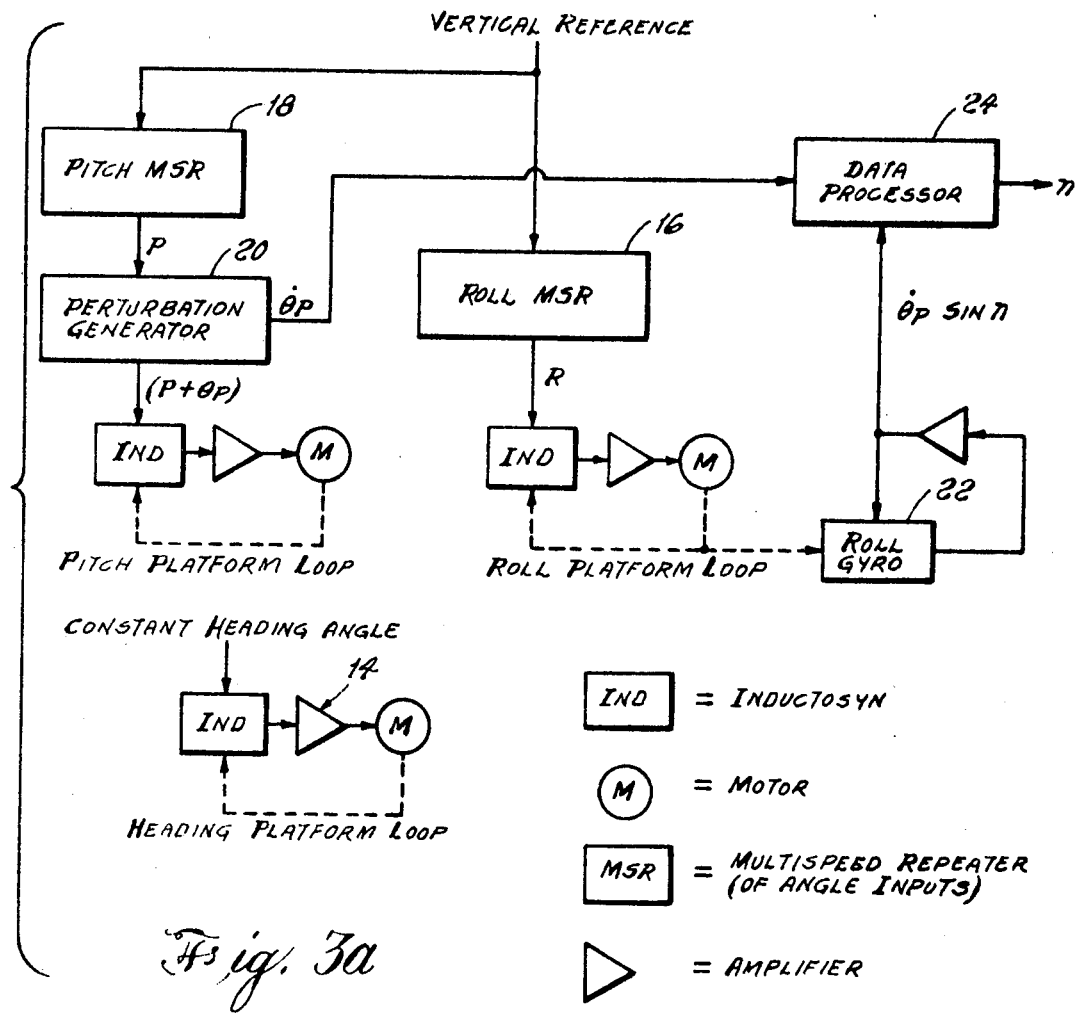
FIG. 3A is a diagram illustrating the implementation of the slave-alignment pitch-axis perturbation method.
Figure 3B:
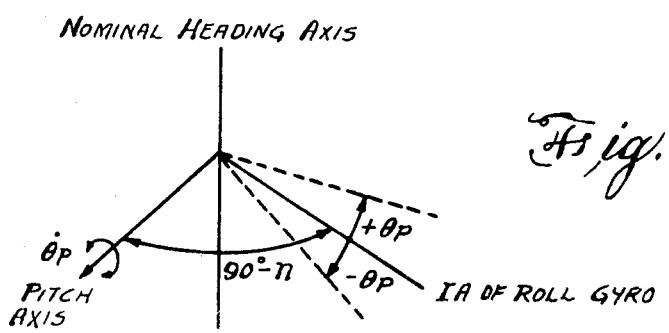
FIG. 3B is a diagram illustrating the orientations of various parameters of the slave-alignment pitch-axis perturbation method.
Figure 4A:
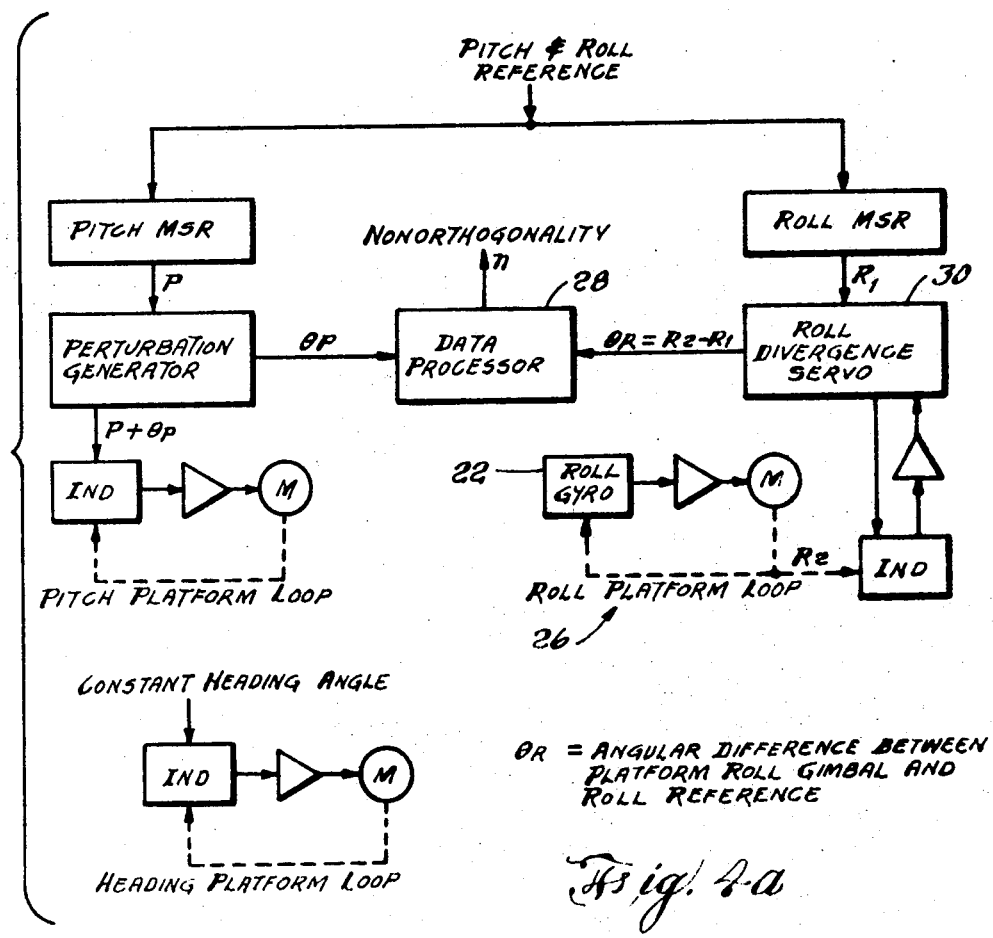
FIG. 4A is a diagram illustrating the implementation of the gyro-stabilized PAP method.
Figure 4B:
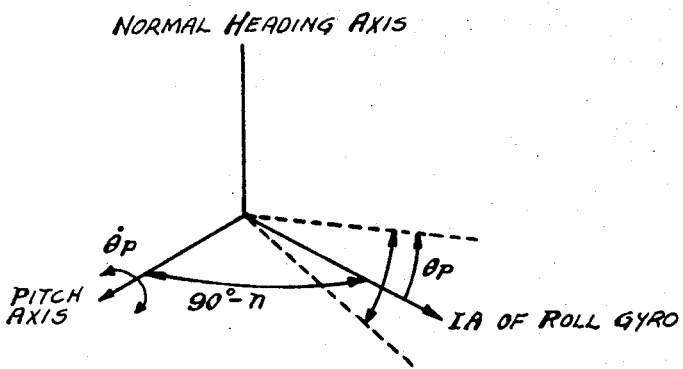
FIG. 4B is a diagram illustrating the orientations of various parameters of the gyro-stabilized PAP method.

A. Slave alignment Pitch-Axis Perturbation:

As shown in FIG. 3A, the angles of the stable platform are slaved to the following external references:

1. Heading: a constant heading angle value is fed to the heading platform loop 14 such that the input axis of the gyro to be calibrated (the roll, or east-seeking, gyro) is nominally perpendicular to the stable platform pitch axis;
2. Roll and pitch: roll and pitch multispeed repeaters 16 and 18 that are normally repeating the ship's pitch and roll angles as determined by a separate vertical reference (e.g., another inertial navigator). Actually, the reference need only be stable, not necessarily vertical. The perturbation generator 20 causes the entire platform to oscillate about the pitch axis. As shown in FIG. 3B, the input axis of the gyro 22 nominally aligned along the roll axis of the platform (e.g., the east-seeking gyro) will detect a rate, through its torque feedback loop, equal to $\theta_p \sin n$. This signal is processed by averaging it in a time-coherent (long-time-constant) filter located in the data processor 24. Specifically, the gyro output is modulated by a function whose sign is the same as that of the perturbation rate, $\theta_p$, (e.g., a square wave of unity amplitude), integrated, and then divided by the time of integration. The non-orthogonality, $n$, is then calculated from the pitch axis perturbation equation by dividing the processed gyro output by the average magnitude of the perturbation rate. Auxiliary functions may also be performed, depending upon accuracy desired, noise characteristics, equipment configuration, etc.

B. Gyro-Stabilized Pitch Axis Perturbation:

The implementation of this method is similar to that shown in FIG. 3A, except that the gyro to be calibrated 22 is used to stabilize the roll platform loop 26 instead of being placed in a torque feedback mode. In the gyro-stabilized configuration, the roll gimbal is constrained to rotate in inertial space about the roll-gyro input axis at a rate equal to the rate command to the gyro. As a result, the perturbation signal $\dot{\gamma} = \theta_p \sin n$ is manifested as the relative rate about the roll axis between the roll gimbal and the pitch gimbal. This is identical to the rate of change of the indicated roll angle. The simplification of this implementation compared to that of slave-alignment axis perturbation is realized primarily in the data processor 28. The functions of the time-coherent filter described earlier are exactly duplicated by measuring the integral of the rate of change of indicated roll angle ( $\int \theta_p \sin n \, dt$ = change in indicated roll angle). Again, using the equation of FIG. 2, the non-orthogonality, $n$, is calculated by dividing the change in roll angle, $\Delta\theta_R$, by the change in perturbation angle, $\Delta\theta_p$. By averaging all such measurements made each half cycle of perturbation, the time-coherent modulation effect is automatically provided by the alternating sign of the perturbation angle change each half cycle.

Some of the advantages of the gyro-stabilized method, as compared to the slave alignment method are:

1. a torque feedback loop need not be provided around the gyro to be calibrated;
2. gyro torquing limitations do not limit the rates that can be processed to obtain measurement of input axis non-orthogonality;
3. integration of the output signal $\dot{\gamma} = \theta_p \sin n$ is conveniently provided by merely measuring the change in indicated roll angle, compared to the roll reference. This eliminates the need for a separate integrator and averages;
4. provision of a separate synchronizer and modulator for providing the time-coherent-filter feature is eliminated. Timing is no longer critical;
5. the roll stabilization loop of the inertial navigator is in effect a high performance rate servo with excellent stiffness against torque disturbances. In comparison to the slave-alignment mode, stiffness is many times greater. This can be critical, since errors in roll gimbal rate or roll angle may cause significant errors.

Figure 5A:
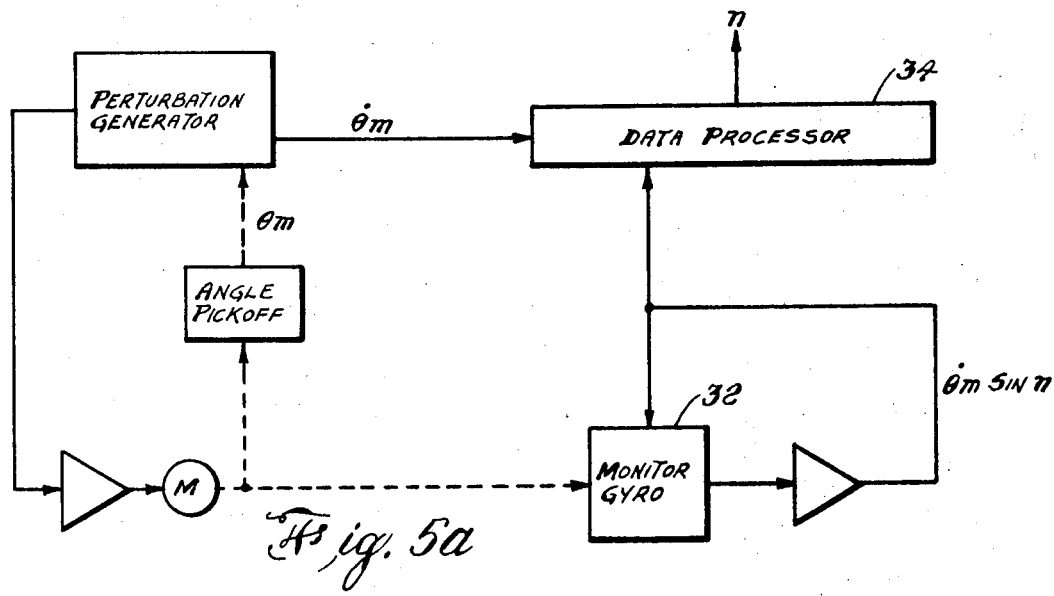
FIG. 5A is a diagram illustrating the implementation of the monitor axis PAP method.
Figure 5B:
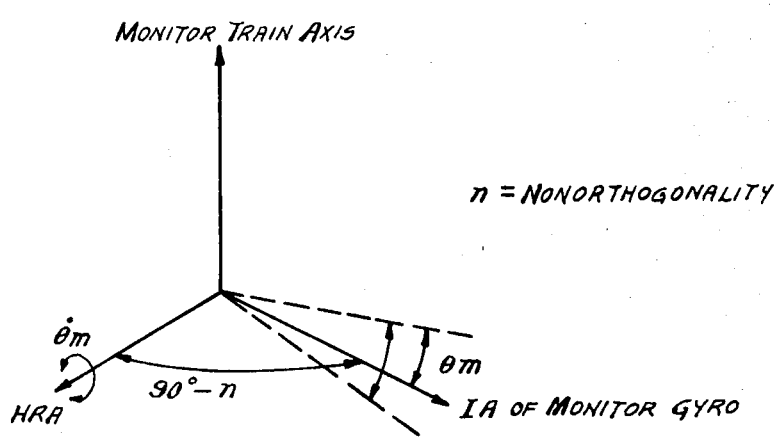
FIG. 5B is a diagram illustrating the orientations of various parameters of the monitor axis PAP method.

C. Monitor-Axis Perturbation:

This implementation (FIG. 5A) of the perturbation concept is applicable to platforms that carry gyro monitors. The input axis of the monitor gyro 32 is perturbed about the heading reference axis, HRA, (see FIG. 5B) and the axis perturbation signal $\dot{\gamma} = \theta_m \sin n$ is measured by the monitor- gyro torque-feedback loop. The data processor 34 integrates this rate over half a perturbation cycle, and division by the change in perturbation angle during the same interval yields the non-orthogonality, n. Other features of the time-coherent filter are provided as described in the discussion of the gyro-stabilized concept.

The primary advantages of this method as compared to the pitch-axis perturbation method are:

1. no external references are required;
2. the inertial navigator need not be taken out of its regular navigate mode, although monitoring of the level gyro is interrupted;
3. many of the error sources experienced by the axis perturbation method implementations do not affect the monitor axis perturbation implementation. The extra degree of freedom required of the gyro monitor need only provide limited angular motions, probably less than ± 2°. An alternative calibration scheme requires 180° of motion and is further characterized by calibration errors that are proportioned to the secant of the ship's latitude.

E. Dual Pitch Axis Perturbation:

This implementation is virtually a combination of the gyro-stabilized and monitor-axis perturbation methods, with the exception that a new horizontal rotation axis for the gyro monitor axis is not required. Such a configuration combines all of the features of gyro-stabilized perturbation while providing conditions for measuring the misalignment of the monitor gyro and either the $x$ or the $y$ gyro. Processing of the monitor gyro output, as in monitor-axis perturbation, provides the misalignment between the monitor and level gyros without many of the error sources experienced in the pitch-axis perturbation implementation. Non-orthogonality of the monitor-gyro input axis to the pitch axis is readily calculated from the two perturbation measurements. A similar implementation is possible utilizing the slave-alignment perturbation; however, it does not have all the advantages described above.

F. Miscellaneous Implementations:

In all of the implementations previously described, the heading platform loop is slaved to a constant heading angle. Conceptually, this is not essential, provided that the angular change of the gyro input axis relative to the pitch axis is measured accurately and appropriate compensations are calculated and applied. Extensions of this idea to perturbation about the pitch axis while retaining normal functional characteristics of the equipment is conceptually feasible. Perturbation about the roll axis is also feasible. A variation of the gyro-stabilized perturbation implementation that has several advantages is to perturb in synchronization with the roll motion of the ship in order to minimize the effect of roll transmission errors. Because the perturbation wave shape is not critical, it is possible to alter the form of the perturbation signal to minimize certain effects. For example, the platform can be perturbed about the pitch axis at maximum slew rate whenever the roll angle of the ship peaks, as determined by the roll rate becoming less than a certain threshold value. In this way, the effect of roll transmission error is minimized, since the data is taken when the roll angle is changing a minimum amount. This results in less averaging time being required for minimizing the roll transmission error, as well as an attendant reduction of relatively stringent stability requirements of the roll reference.

It will be understood that various changes in the details, materials, and arrangements of parts (and steps), which have been herein described and illustrated in order to explain the nature of the invention, may be made by those skilled in the art within the principle and scope of the invention as expressed in the appended claims.

We claim:

1. A method for determining the misalignment of the input axis of a gyro with respect to a reference axis comprising the steps of:

setting the input axis of the gyro in nominally orthogonal relation to a reference axis, any difference in the position of the input axis from the true orthogonal being the misalignment, $n$ ;

oscillating the gyro about the reference axis so that the gyro's input axis moves through an angle, called the perturbation angle $\theta_p$, on either side of the plane formed by the original position of the input axis and the reference axis, this plane being orthogonal to the plane of the perturbation angle;

obtaining a rate output, $\gamma$, from the gyro which indicates the component along the input axis of the rate of change of the perturbation angle, $\gamma$ being equal to $\theta_p \sin n$; and converting the rate output, $\gamma$, to the magnitude of the misalignment, $n$.

2. A method as set forth in claim 1, wherein the perturbation angle, $\theta_p$, is a small angle and the rate of perturbation is rapid relative to the horizontal earth rate of rotation.

3. A method as set forth in claim 1, wherein the perturbation angle, $\theta_p$, is a small angle of the order of 4° and the rate of perturbation is of the order of 1° per second.

4. A method as set forth in claim 1, wherein the reference axis is the pitch axis of the stable platform of a ship's inertial navigation system and the gyro is the east-seeking gyro of the system, the input axis of the east-seeking gyro being set nominally at 90° to the pitch axis heading.

5. A method as set forth in claim 2, wherein the reference axis is the pitch axis of the stable platform of a ship's inertial navigation system and the gyro is the east-seeking gyro of the system, the input axis of the east-seeking gyro being set nominally at 90° to the pitch axis heading.

6. A method as set forth in claim 3, wherein the reference axis is the pitch axis of the stable platform of a ship's inertial navigation system and the gyro is the east-seeking gyro of the system, the input axis of the east-seeking gyro being set nominally at 90° to the pitch axis heading.

7. A method for measuring the non-orthogonality of a ship's inertial navigation system comprising the steps of:

slaving the heading platform loop of the ship's inertial navigation system (SINS) to a constant heading angle;

setting the input axis of the roll gyro to nominal orthogonality relative to the pitch axis of the stable platform;

unslaving the roll axis of the SINS;

oscillating the roll gyro about the pitch axis of the stable platform;

obtaining from the roll gyro an output indicating the value of the component along the roll-gyro input axis of the rate of change of the pitch-axis perturbation angle;

obtaining an output indicating the rate of change of the pitch-axis perturbation angle; and utilizing said outputs to compute the misalignment of the roll-gyro input axis with the orthogonal to the platform pitch axis.

8. A method as set forth in claim 7, wherein the perturbation angle is a small angle and the rate of perturbation is at least ten times greater than the horizontal earth rate of rotation.

9. A method as set forth in claim 7, wherein the perturbation angle is a small angle of the order of 4° and the rate of perturbation is of the order of 1° per second.

* * * * *